United States Patent [19]

Clark

[11] Patent Number: 5,377,189

[45] Date of Patent: Dec. 27, 1994

[54] HYBRID DATA COMMUNICATIONS SYSTEMS

[75] Inventor: Alan D. Clark, Near Devizes, United Kingdom

[73] Assignee: British Telecommunications public limited company, London, England

[21] Appl. No.: 161,865

[22] Filed: Dec. 6, 1993

Related U.S. Application Data

[63] Continuation of Ser. No. 761,908, Sep. 25, 1991, abandoned.

[30] Foreign Application Priority Data

Jun. 2, 1989 [GB] United Kingdom ............... 8912768

[51] Int. Cl.⁵ ............................................... H04J 3/02
[52] U.S. Cl. ................................. 370/85.9; 370/85.6; 370/85.2; 340/825.5
[58] Field of Search ................. 370/85.1, 85.2, 85.3, 370/85.6, 85.9, 60, 94.1, 79, 95.1, 95.3, 58.1, 58.2, 85.13; 340/825.5, 825.51, 825.52; 371/5.4, 20.6, 29.1, 29.5, 32, 33, 42, 47.1

[56] References Cited

U.S. PATENT DOCUMENTS

| | | | |
|---|---|---|---|
| 4,292,623 | 9/1981 | Eswaran et al. | 370/85.2 |
| 4,334,288 | 6/1982 | Booher | 364/900 |
| 4,451,827 | 5/1984 | Kahn et al. | 370/85.2 |
| 4,535,448 | 8/1985 | Baxter et al. | 370/85.9 |
| 4,593,282 | 6/1986 | Acampora et al. | 370/85.6 |
| 4,653,047 | 3/1987 | Vij et al. | 370/85.2 |
| 4,707,831 | 11/1987 | Weir et al. | 370/94.1 |
| 4,719,617 | 1/1988 | Yanody, Jr. et al. | 370/85.2 |
| 4,872,162 | 10/1989 | Follett et al. | 370/85.2 |
| 4,989,203 | 1/1991 | Phinney | 370/85.13 |
| 5,119,481 | 6/1992 | Frank et al. | 370/85.1 |
| 5,253,253 | 10/1993 | Brame et al. | 370/95.1 |

FOREIGN PATENT DOCUMENTS

| | | |
|---|---|---|
| 0122765 | 10/1984 | European Pat. Off. |
| 0179629 | 4/1986 | European Pat. Off. |
| 2114788A | 8/1983 | United Kingdom |
| 2114789A | 8/1983 | United Kingdom |

OTHER PUBLICATIONS

Acampora et al., "A Centralised-Bus Architecture For Local Area Networks" IEEE Int'l Conf. on Comm., (Jun. 19–22, 1983).

IBM Technical Disclosure Bulletin, vol. 24, No. 2, Jul. 1981, (New York, US), L. M. Pusater, Jr: "Two-bit bus communication discipline with inherent priority contention resolution", pp. 912–913.

Tokinaga, "A Traffic Control Method by Adaptive Reservation Scheme Using Subchannel on Bus-Type Local Networks for Integrated Voice and Data", Elec. and Comm. In Japan, Part 1, vol. 69, No. 6, 1986, pp. 72–78.

Primary Examiner—Douglas W. Olms
Assistant Examiner—Dang Ton
Attorney, Agent, or Firm—Nixon & Vanderhye

[57] ABSTRACT

A hybrid data communication system comprises synchronous line cards(3) and asynchronous line cards(2) connected to a common data bus(1) includes a contention bus(7) arranged to communicate contention signals between the line cards(2,3). The synchronous line cards are arranged to transmit a high priority contention signal to suspend any outgoing transmission by an asynchronous card(3) and to gain access to the bus(1) of synchronous data. The contention bus includes an acknowledgement line(ACK) which is driven low by a receiving line card to indicate that it is receiving data. The receiving line card performs error checking and only receives the acknowledgement when the received data is determined to be error free. In a preferred example, the asynchronous line cards(2) are arranged to monitor the contention line(7) to detect the initiation of a contention cycle by a synchronous line card(3). Subsequently on the completion of the contention cycle the asynchronous cards(2) interrupt ant outgoing transmission of a data frame to allow the transmission of data by the synchronous card(3).

9 Claims, 5 Drawing Sheets

Fig. 4.

| TRANSMITTING ORDER | | |
|---|---|---|
| 1st | BIT 7 CELL/PACKET | BIT 6 CONTENTION PERSISTENCE |
| 2nd | BIT 5 NOT USED BIT RESET | BIT 4 CARD ADDRS |
| 3rd | BIT 3 CARD ADDRS | BIT 2 CARD ADDRS |
| 4th | BIT 1 CARD ADDRS | BIT 0 CARD ADDRS |

BITS 0 TO 4     ADDRESS OF CONTENDING CARD
BIT 5     UNUSED
BIT 6     CONTENTION PERSISTENCE BIT
BIT 7     FRAME IDENTIFIER

HYBRID DATA COMMUNICATIONS SYSTEMS

This is a continuation-in-part of application Ser. No. 07/761,908, filed Sep. 25, 1991, now abandoned.

BACKGROUND OF THE INVENTION

1. Field of the Invention

The present invention relates to data communication systems such as those used, for example, in digital multiplexers or packet switches.

2. Description of Related Art

Typically such a data communication system comprises a data bus to which a number of line cards are connected. Each line card is arranged to receive data from an external source and to transmit the data via the bus to a selected one of the other cards connected to the bus. The receiving line card then outputs the data via its respective line or lines.

Nowadays it is common practice to use such a system for the transmission of asynchronous data. For example a system might comprise a bus and a number of X25 line cards connected to the bus. The X25 card is designed to handle a 64 kilobit data stream with the data assembled into frames which are transmitted from the card asynchronously. Since the card operates asynchronously there is no need for a given frame of data to occupy a particular time slot and so a system incorporating such asynchronous cards functions without need of any central controller providing clocking signals. However in the absence of such a central controller it is necessary to provide some means of ensuring that data is not corrupted by two cards accessing the bus simultaneously. To this end it is known to use contention systems in which the cards transmit contention signals between each other to establish which card has the right to access the bus at a particular instant. Examples of such systems are disclosed in GB-A-2114788, GB-A-2114789 and U.S. Pat. No. 4,334,288. It has also been proposed, e.g. in EP-A-0122765, to enable a card to transmit a priority contention signal so that if the card in question and another card with lower priority attempt to access the bus within the same contention cycle the privileged card is always allowed access to the bus first.

SUMMARY OF THE INVENTION

According to the present invention a hybrid data communication system comprises synchronous line cards and asynchronous line cards connected to a common data bus including a contention bus arranged to communicate contention signals between the line cards, characterised in that: the synchronous line cards are arranged to transmit a high priority contention signal to suspend any ongoing transmission by an asynchronous card and to gain access to the bus for the immediate transmission via the bus of synchronous data; the contention bus includes an acknowledgement line; and the line cards are arranged to transmit a signal on the acknowledgement line while receiving data to indicate that the data bus is busy, and arranged when transmitting data to transmit an error checking character and when receiving data to determine from the error checking character whether the received data is error free, and only to cease transmitting the signal on the acknowledgement line when the data is so determined.

The use of a single bus to carry both synchronous and asynchronous data has received little attention due to the technical difficulties involved. Acampora et al ("A Centralised-Bus Architecture for Local Area Networks" IEEE International Conference on Communications June 19–22 1983) and/or U.S. Pat. No. 4,593,282 discuss a reservation scheme by which synchronous data may be sent over an essentially asynchronous bus. In this scheme, a time offset may be provided between contention and data bus access. However, a synchronous line card must wait until at least the start of the following time slot to contend for the next available time slot—and is initially given no contention priority. Once assigned an available time slot, then a higher priority contention code permits the synchronous card thereafter to reserve a synchronously recurring time slot for the length of an entire communication message. In the present invention, by contrast, the synchronous line card may suspend the transmission of an asynchronous packet greatly reducing the delay and providing a hybrid synchronous/asynchronous system with a significantly improved performance.

By providing an acknowledgement line, as mentioned above, the line cards can monitor this line. Thus, any asynchronous line card wishing to transmit will wait until this line indicates that the data bus is free before beginning a contention sequence, but any synchronous line card wishing to transmit will begin a contention sequence without regard to the state of the acknowledgement line.

The present invention uses the transmission of priority contention signals from the synchronous cards effectively to clear the bus of asynchronous traffic and hence to ensure that the synchronous data from the card in question is transmitted in the appropriate time slot. Then, for example, in a system with a single synchronous card transmitting data and a number of asynchronous cards the greatest delay the data from the synchronous card can be subject to is the length of one contention cycle and this will be substantially less than the length of one of the asynchronous data frames. Unlike known contention systems for asynchronous traffic, in the present invention the contention mechanism is not used merely to provide a queueing system for the transmission of whole frames but will also where necessary suspend any ongoing transmission of an asynchronous frame to give the synchronous card immediate access to the bus. When the synchronous transmission is complete and the synchronous card releases the bus, the transmission of the asynchronous frame is then completed. As in known dedicated asynchronous systems the contention mechanism is arranged so that no fresh asynchronous transmission is started before the ongoing asynchronous frame transmission is complete.

Preferably the bus is a dual bus comprising two independent data buses and each of the cards is arranged to contend for each of the buses.

The provision of a dual bus increases the reliability of the system. A card may contend for both buses simultaneously and in general will gain access to one or the other. If the card gains access to both it may select one or the other on any equitable criterion. In general, the contention address, which establishes the priority of the card during the contention cycle, will be different for each bus, ensuring an equitable distribution of traffic. If a fault occurs on one of the two buses all the cards are instructed to use the other bus.

BRIEF DESCRIPTION OF THE DRAWINGS

A system in accordance with the present invention is will now be described in detail with reference to the accompanying drawings, in which:

FIG. 4 is a table showing details of a contention byte.

DETAILED DESCRIPTION OF PREFERRED EMBODIMENTS

Figure 1:
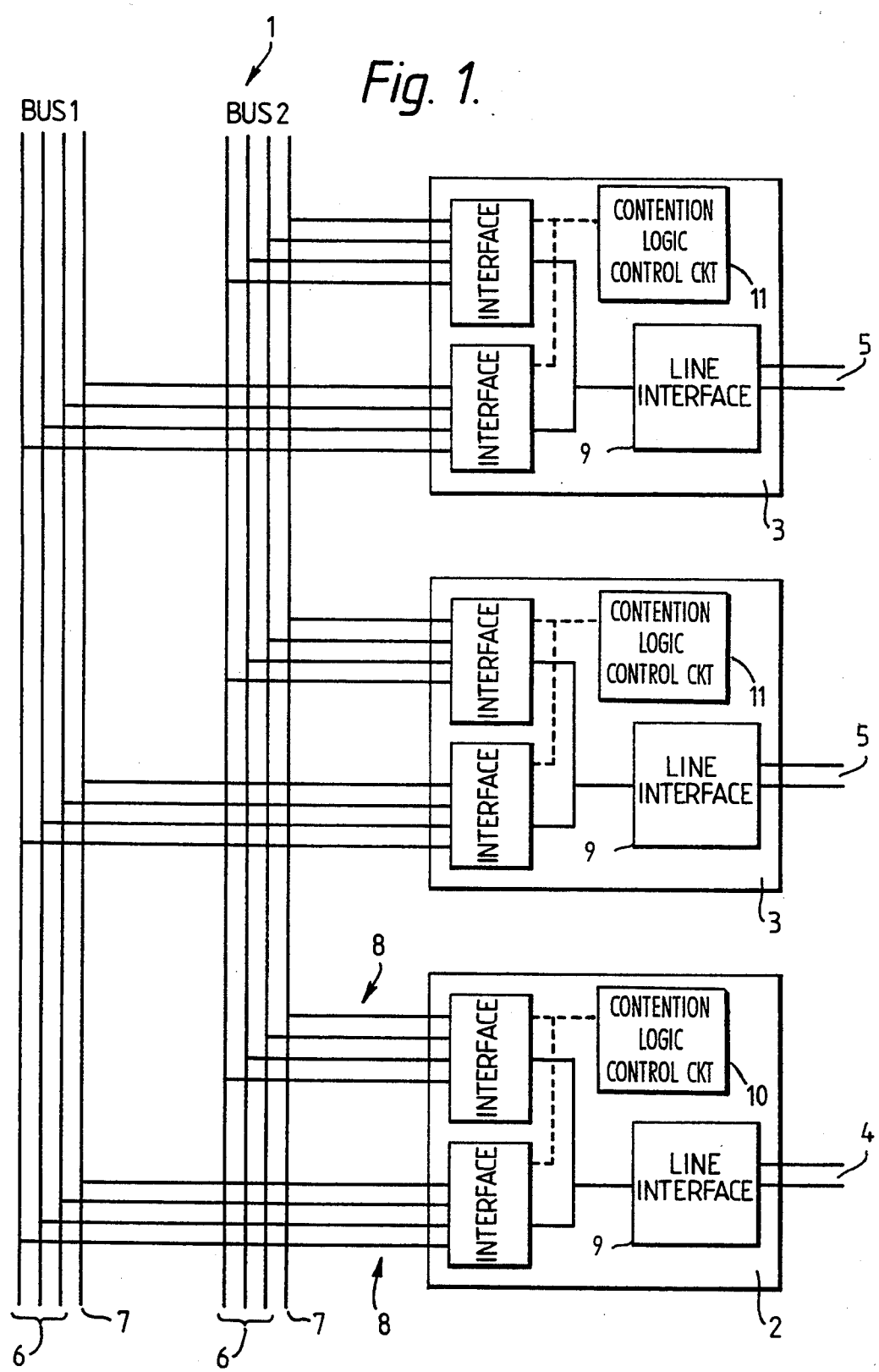
FIG. 1 is a block diagram of a data communication system.

A hybrid data communication system comprises a data bus 1 and a number of modules connected to the bus 1. The modules include asynchronous line cards 2 and synchronous line cards 3. The other modules (not shown) fulfil such functions as interfacing the bus 1 to other data buses. These other modules operate in an entirely conventional manner and so will not be described in further detail here.

Each of the line cards 2, 3 is connected to a line 4, 5 linking the system to an external subscriber (not shown). The line card is arranged to transmit data to and from the bus and to and from the external subscriber.

The data bus i is formed as a dual bus comprising two independent buses, BUS1, BUS2. Each of the buses BUS1, BUS2 includes a number of data lines 6 for transmitting data between the cards 2, 3 and a contention bus 7 for transmitting contention signals between the cards. The cards 2, 3 contend for both buses BUS1, BUS2 and if they gain access to both choose arbitrarily between the use of one bus or the other. When one of the cards needs to gain access to the data lines it initiates a contention cycle by transmitting a contention signal via the contention bus 7 to the other cards. The contention procedure is arranged so that at the end of a contention cycle only one card has access to the bus for transmission. The contention procedure is also arranged so that when one of the synchronous cards 3 needs to access the bus 1 then the bus 1 is cleared of asynchronous traffic so that the card 3 can immediately transmit data onto the line in a desired time slot. The operation of this contention mechanism is described in further detail below.

In the present example the asynchronous cards 2 are X25 modules arranged to handle an asynchronous 64 kilobit PCM data stream. On the bus side of the card 2 there are connections 8 linking the card 2 to the data lines 6. Each X25 card 2 can transmit via the connections 8 onto the data lines 6 data received from its incoming line. The data is transmitted as variable length packets up to a maximum of 256 bytes. Similarly each card can receive from the bus a packet transmitted by another card and subsequently output that packet on its outgoing line or lines.

The synchronous cards 3 are arranged to receive a time-division multiplexed synchronous data stream which will typically have a data rate considerably lower than that of the traffic received by the X25 asynchronous cards. Data received by a synchronous card 3 is transmitted via a line interface 9 onto the data lines 6 for transmission as a short fixed length high priority cell of 5 or 6 bytes via the bus 1 to another synchronous line card 3.

Each card 2, 3 includes in addition to a line interface 9 for handling data a contention logic control circuit 10, 11 connected to the contention bus 7 and arranged to receive and transmit contention signals. Each card has associated with it a contention address which determines its priority in the contention cycle. The contention address consists of an 8-bit word split into di-bits as shown in the table of FIG. 4. The contention bus 7 comprises two separate buses BUS A, BUS B, and two contention address lines, one for each bit of the di-bit, a contention active line CONTn. ACT used to indicate that a contention sequence is in progress and an acknowledge line ACK. Any card wishing to contend for access to the data bus monitors the contention active line on a falling edge of the signal of the clock line. If the contention active line is low then a contention sequence is already in progress and the card has to wait for this to finish. When the contention active line is high the card can then contend for the bus on the next rising edge of the clock line. At that time the or each card wishing to contend forces the contention active line low and transmits the contention address to the contention bus. The logic circuitry formed within the contention logic control circuits 10, 11 which carries out the contention resolution is shown schematically in FIG. 2. This circuit obeys the following rules:

| Output | Bus | FAIL |
| --- | --- | --- |
| 0 | 0 | asserted |
| 0 | 1 | negated |
| 1 | 0 | negated |

The contention circuitry compares the module's own contention address, which is applied to the inputs of the circuitry a di-bit at a time, with the other contention addresses broadcast on the contention bus. The priority of the module's own contention address is compared with that of the other contention addresses on the contention bus and only if the module does not have a lower priority is $\overline{\text{FAIL}}$ asserted. After a period of time the buses settle down with all losing cards backing off having $\overline{\text{FAIL}}$ active (i.e. low). The contention mechanism is arranged so that at the end of the contention cycle only one card has $\overline{\text{FAIL}}$ assented (i.e. high) and so is free to transmit data on the bus.

Figure 2:
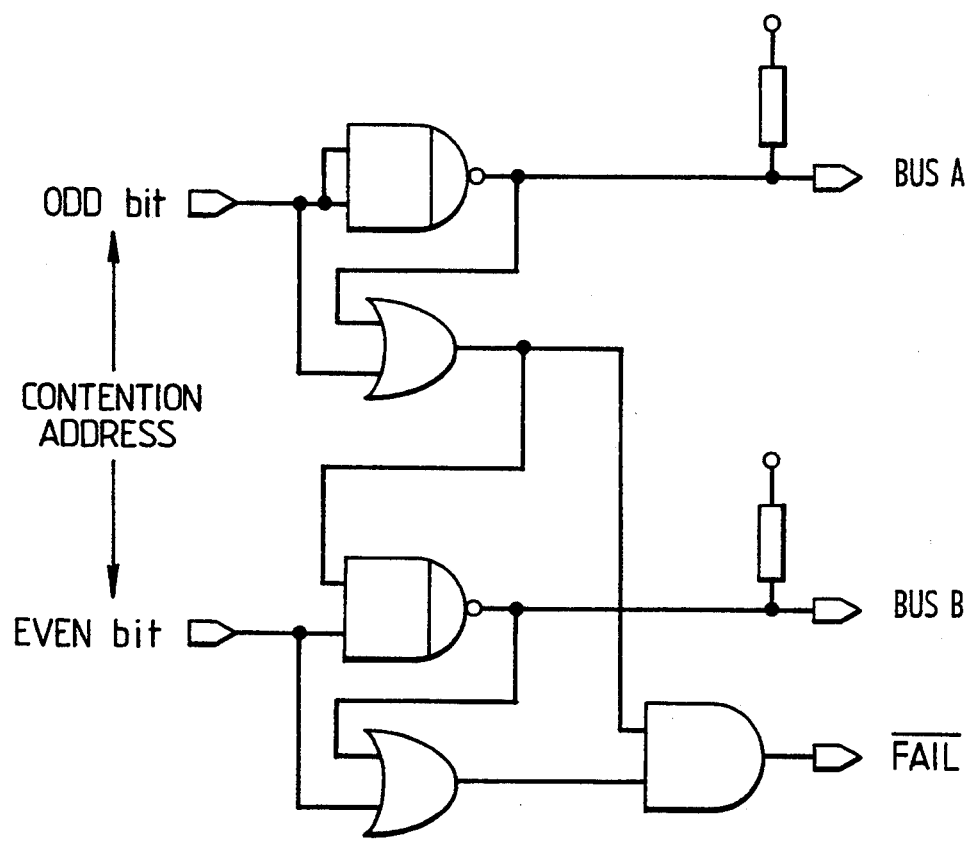
FIG. 2 is a diagram showing logic circuitry for use in the system of FIG. 1.

The output of the contention circuitry shown in FIG. 2 is taken to a control module formed within the control circuitry 10, 11 which arbitrates the contention process in accordance with a number of contention rules. The first transmitted bit of the contention address is bit 7. This bit is set to indicate whether the data is an asynchronous packet or a synchronous cell. The contention rules provide that a cell has higher priority than a packet and a cell may non-disruptively interrupt the transmission of a packet. Individual bytes of a packet are transmitted whenever space exists between cell transfers. Both cells and packets contain error checking characters and when the transfer of the cell or packet is complete the receiver acknowledges a successful or unsuccessful attempt. The contention mechanism is arranged so that after an unsuccessful attempt then an immediate re-transmission occurs. The contention mechanism also allows for contention persistence whereby after once failing in a contention cycle the priority of the card is at a higher value in the next contention and subsequent cycles until it gains access to the bus. As noted above In practice the data and contention buses are duplicated and the contention rules are also chosen to ensure equal loading of both of the data buses.

Although the contention rules allow a cell to interrupt a packet, a pacKel transmission is not itself allowed to interrupt any ongoing transfer of data over the bus. If a card wishes to transmit a packet it first senses the state of the ACK line. If this is low, indicating that data is active on the bus, the card waits until the data transfer is over as indicated by ACK going high before beginning the contention sequence. This ensures that the contention system is kept free to be used by the cell transfer cards.

An asynchronous line card 2 transmitting a packet over the data bus 1 continuously monitors the contention active line looking for a falling edge. If this occurs, indicating that a synchronous line card 3 has started contention for the bus, the packet continues to be transmitted until the contention sequence has finished. At the end of the contention sequence when the contention active line goes high, the packet transmission is halted and the asynchronous line card 2 receiving the packet releases the ACK line. This hands over the data bus 1 to the synchronous card 3 so that the card 3 can transmit the synchronous cell. Both the receiving and transmitting asynchronous cards continue to monitor the ACK line Looking for a rising edge indicating a successful end to the cell transfer. Control of the bus 1 is then handed back to the asynchronous cards 2 on the next rising edge of the clock, provided that during the transmission of the cell the contention active line has remained high, indicating that no further synchronous cell will immediately follow. The transmission of the packet data frame between the asynchronous cards 2 is then resumed and the ACK line reasserted by the receiver. The receiving and transmitting asynchronous cards 2 continue to monitor the contention active line.

Figure 3:
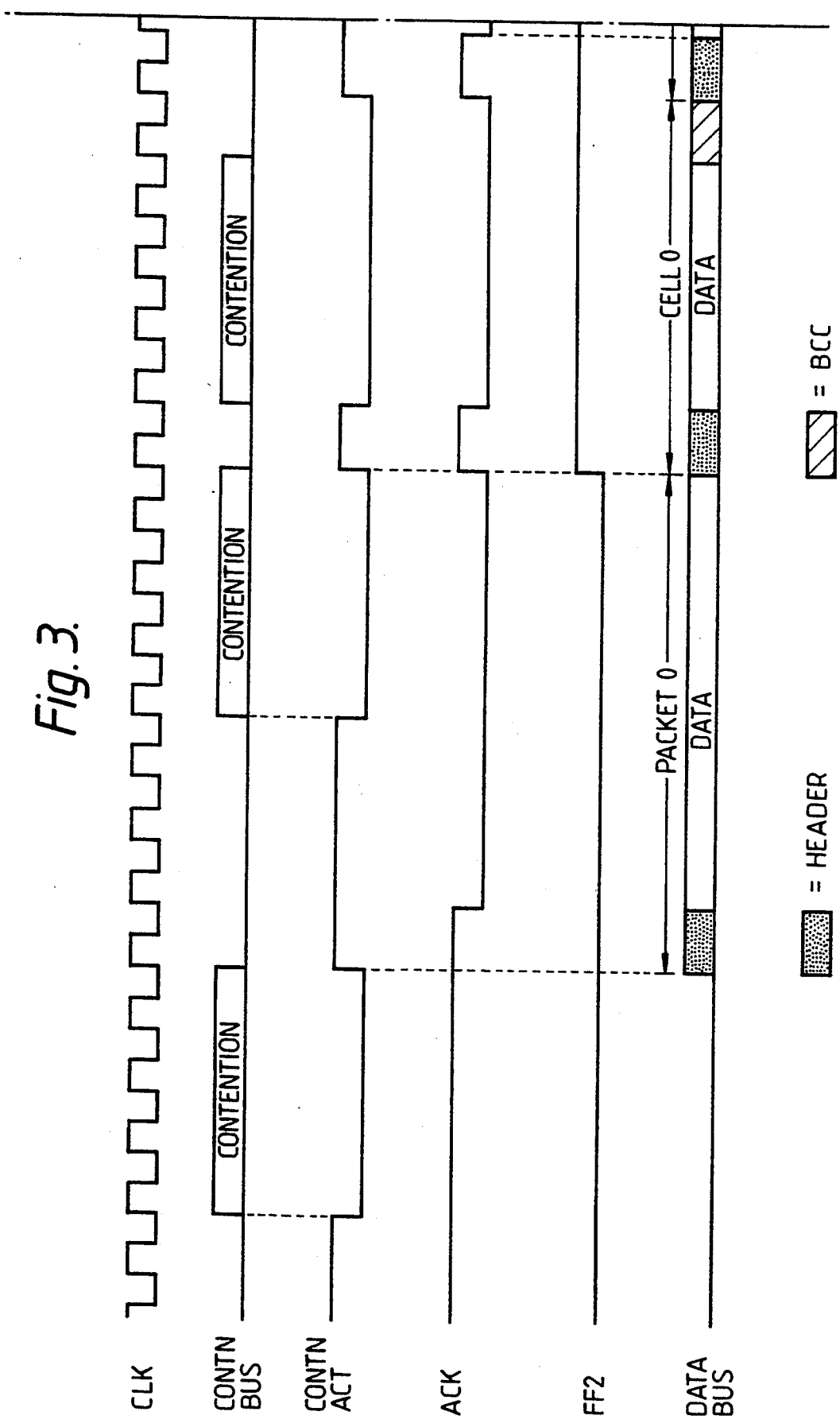
FIG. 3 is a timing diagram showing the bus contention cycle.
Figure 3:
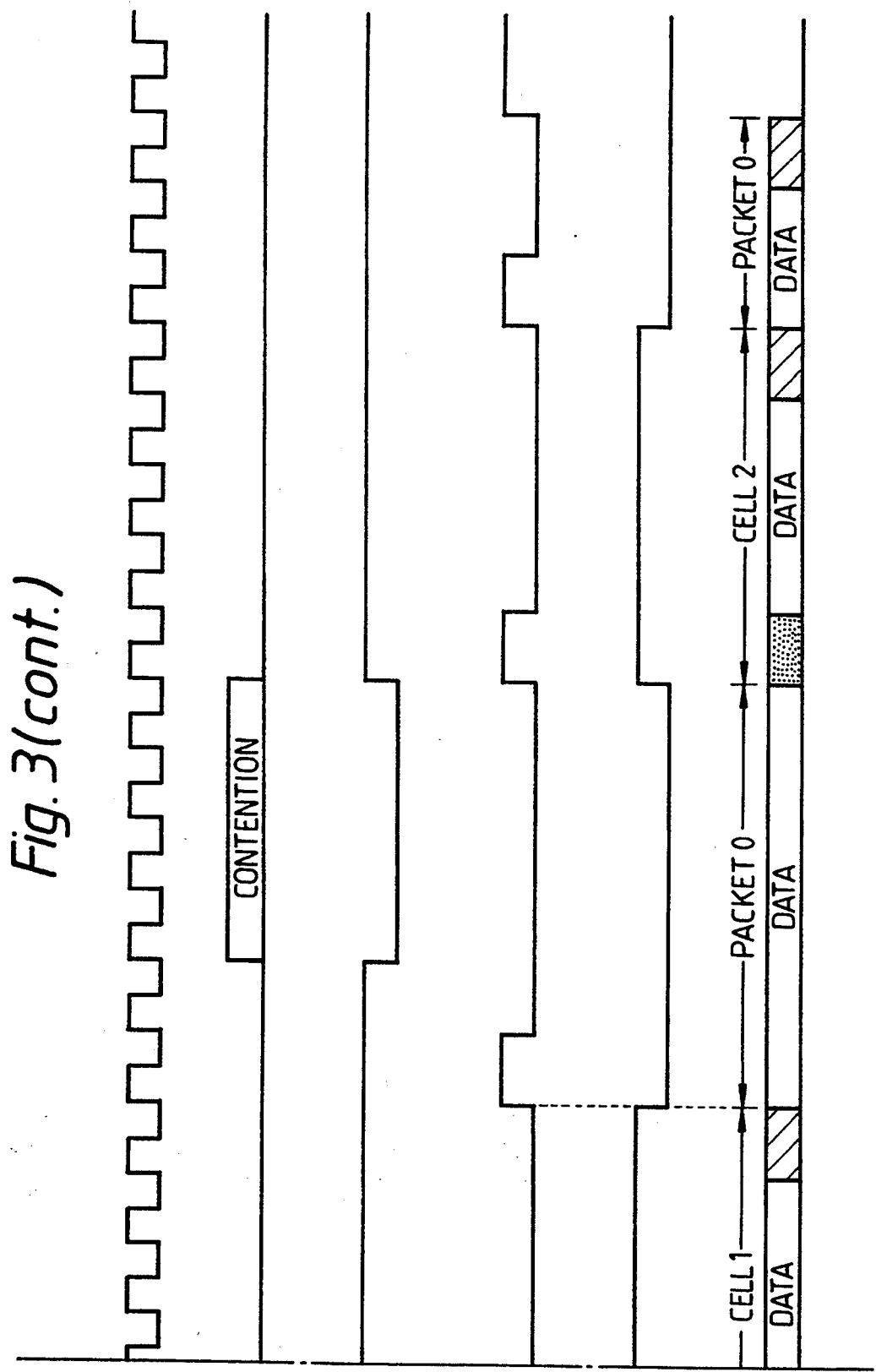

The timing of the contention process is shown in FIG. 3. The contention process is dynamic, that is the only constraint on the timing of the process is that it must be in synchronism with the master clock and any card is free to attempt to initiate a contention cycle at any time.

As noted above the contention bus includes an acknowledgement line ACK. This line ACK serves two purposes. Firstly it is used to indicate that a data frame is active on the data bus and secondly it gives acknowledgement to the data transfer, When a data frame is sent to the data bus 1 all cards listen to the first byte of data which is monitored on the first falling edge of the clock after detecting the rising edge of the contention active line. This byte of data contains information relating to the frame type and destination. If a card recognises its own address it forces the ACK line low and receives the following data.

The last byte of the frame contains an error checking character. This is used by the receiving card to determine if the frame has been received without error. If an error has been detected the frame needs to be retransmitted and this is done by the transmitting card if at the end of the transfer the ACK line does not go high. The receiving card therefore only releases ACK if the error check indicates that the received frame is error free. To prevent a lock-up occurring the transmitting card only attempts three successive transmissions before giving up. An acknowledgement can only occur after a CRC character. Therefore when a packet is interrupted by a cell the following ACK will be an acknowledgement to the cell and not to the packet.

The timing diagram also shows the state of flip-flop FF2 which is an internal element of the control module used to detect the presence of a cell or packet on the data bus 1. Flip-flop FF2 goes high at the start of a synchronous cell and remains, high until that cell or the last of a continuous train of cells has ended and then goes low. Thus the flip-flop FF2 can be monitored by the receiving and transmitting asynchronous line cards to determine when to resume asynchronous transmission and reception.

Whereas in the aforedescribed embodiment the receiving and transmitting asynchronous line cards can monitor the ACK line and the contention active line (or the state of flip-flop FF2), alternatively they can, if the number of bytes in a synchronous cell is predetermined, count the number of bytes on the data bus (or count an equivalent number of clock pulses) and resume asynchronous activity when the appropriate number of bytes has been counted, again taking into account whether there has been any further contention activity.

I claim:
1. A hybrid data communication system comprising:
synchronous line cards and asynchronous line cards connected to a common data bus including a contention bus arranged to communicate contention signals between the synchronous and asynchronous line cards respectively,
said synchronous line cards being arranged to transmit a first priority contention signal to suspend any ongoing transmission by an asynchronous line card and thus to gain access to the common data bus for immediate transmission via the common data bus of synchronous data;
the contention bus including an acknowledgement line; and
said synchronous and asynchronous line cards being arranged to transmit a signal on the acknowledgement line while receiving data to indicate that the common data bus is busy, and being arranged when transmitting data to transmit an error checking character and when receiving data to determine from the error checking character whether the received data is error free, and only to cease transmitting said signal on the acknowledgement line when the data being received thereat is so determined to be error free.

2. A system according to claim 1, in which said asynchronous line cards are arranged to monitor the contention bus to detect a contention cycle by a synchronous line card and to suspend any ongoing transmission of an asynchronous data frame to allow the immediate transmission of data by said synchronous line card.

3. A system according to claim 1 in which said synchronous line cards transmit data in cells of a predetermined number of bytes, and said asynchronous line cards are arranged, when in a suspended state, actually or effectively to count the bytes of an interrupting transmitted cell and thereby immediately resume respective transmission and reception of an interrupted asynchronous transmission when synchronous transmission ceases.

4. A system according to claim 1 in which said asynchronous line cards are arranged, when in a suspended state, actually or effectively to monitor the acknowledgement line and resume respective transmission and reception of an interrupted asynchronous transmission when the acknowledgement line indicates that the data bus becomes not busy.

5. A system according to claim 4, in which the asynchronous line cards are arranged when in a suspended state, to detect whether during the transmission of an interrupting synchronous cell a synchronous line card has contended for access to the data bus, and, if so, to remain in suspended state.

6. A system according to claim 1, in which the synchronous line cards are arranged to contend for data bus access for each cell to be transmitted.

7. A system according to claim 1 in which said common data bus is a dual bus comprising two independent data buses, and each of said asynchronous and synchronous line cards is arranged to contend for each of the buses.

8. A system according to claim 1 wherein said asynchronous line cards are arranged to respond to the presence of a signal on the acknowledgement line by refraining from transmitting a contention signal onto said contention bus.

9. A hybrid data communication system comprising:
a plurality of synchronous data communication circuits and a plurality of asynchronous data communication circuits connected for time multiplexed data communications with each other via at least one common data bus and at least one common contention signal bus;

said contention signal bus having a dedicated acknowledgement line;

said asynchronous and synchronous communication circuits each being arranged to maintain a busy signal on said acknowledgement line during data reception and error checking operations until error-free data reception has been completed and each being arranged to repeat transmission of data up to a predetermined number of times in the event that an associated receiving line card has not released said acknowledgement to indicate error-free data reception has been completed;

said asynchronous communication circuits being inhibited from contending for use of the data bus whenever said busy signal is present and being interruptible during asynchronous data communication immediately upon receipt of a higher priority contention signal; and each of said synchronous communication circuits being arranged to generate a respective said higher priority contention signal on the contention bus whenever synchronous communication is desired irrespective of whether any busy signal is present on said acknowledgement line.

* * * * *